Nettleton, Raymond & Hatch.
Turning Mach.
No. 3,489. Reissued Jun. 8, 1869.
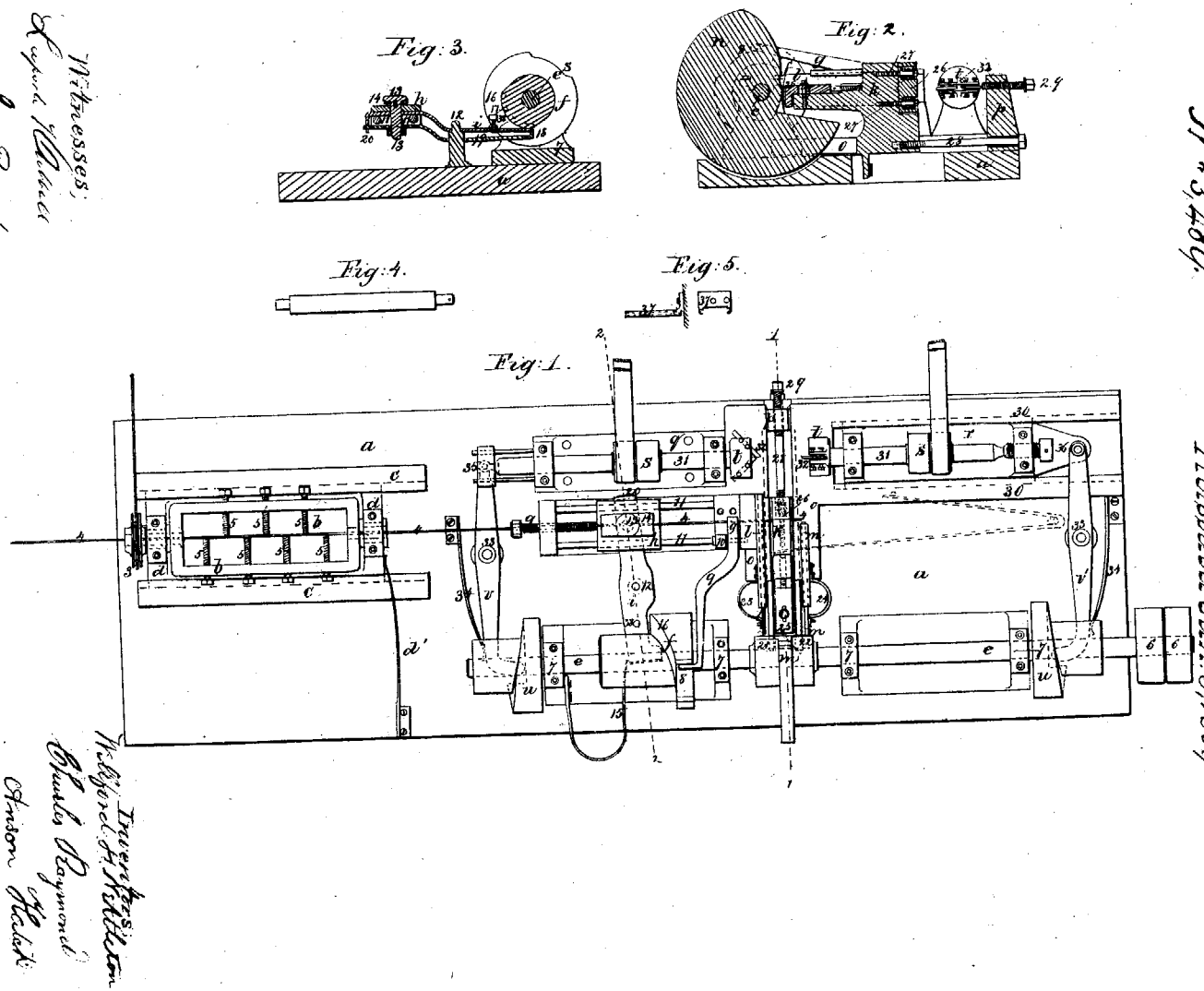
Witnesses;
Lapoh Allen
Sai Beach
Inventors;
Wilford H. Nettleton
Charles Raymond
Anson Hatch
N. PETERS, PHOTO-LITHOGRAPHER, WASHINGTON, D. C.

United States Patent Office.

W H. NETTLETON, OF BRISTOL, CONNECTICUT, ASSIGNEE OF WILLFORD H. NETTLETON, CHARLES RAYMOND, AND ANSON HATCH.

*Letters Patent No.* 18,661, *dated November* 17, 1857; *reissue No.* 3,489, *dated June* 8, 1869.

IMPROVED MACHINE FOR TURNING PILLARS FOR CLOCK-MOVEMENTS.

The Schedule referred to in these Letters Patent and making part of the same.

*To all whom it may concern:*

Be it known that WILLFORD H. NETTLETON, CHARLES RAYMOND, and ANSON HATCH, all of Bristol, in the county of Hartford, and State of Connecticut, did invent certain new and useful Improvements in Means for Turning Pillars, Clock-Work Shafts, and Arbors of Clock-Movements; and the following is hereby declared to be a full, clear, and exact description of the construction and operation of the same, reference being had to the annexed drawing, making part of this specification, wherein—

Figure 1 is a plan of the machine complete;

Figure 2 is a cross-section, at the feeding and holding-jaw, on the line 1 1; and Figure 3 is a cross-section at the line 2 2, showing the compound feeding-lever.

Similar marks of reference denote corresponding parts.

In turning pillars for the frames of clock-movements, lock-works, shafts for the striking-gear, or rounding the ends of arbors or pinions, wires for insertion in the respective parts, or making other articles of wire or rods, it is necessary to straighten, cut, and then hold the wire of which said parts are formed while the ends are being turned. The straightening is sometimes performed in a separate machine, the wire is then cut up into lengths, and then turned.

This machine is adapted to perform all the operations of straightening, cutting, and turning the said lock-work shafts or arbors, and delivering the same in a finished state, or it can be applied, by a small attachment, to feeding and turning blanks that may have been previously straightened, and cut off into lengths, thereby effecting considerable saving in the cost of manufacturing such articles, and producing superior work.

In the drawing—

*a* is the bed of the machine.

*b* is a straightener, revolved by a band to the pulley 3, and formed with screws 5, operating on the wire, 4, as the same passes through between the points of said screws 5 5, to straighten said wire in the usual manner, and it is remarked that any desired revolving straightener may be employed.

If the straightener alone were applied to the wire, the same would not act uniformly, because the wire is fed in suddenly to the machine, and, at such times, said wire would draw through the straightener *b* without being fully straightened. This straightener is, therefore, mounted on a block or carriage, *d*, set in slides *c c*, and a spring, *d'*, is provided, which tends to force the said straightener away from the feeding-apparatus. The operation of this part of the apparatus is, that when the feeding-part of the machine draws the wire along, the straightener slides bodily with it, and then runs back gradually, by the operation of the spring *d'* or its equivalent, straightening the wire as it moves.

*e* is the main shaft of the machine, supported in the bearings 7 7, and driven by competent power applied to the pulleys 6 6 or otherwise.

*f* is the cam that actuates the feeding-apparatus, as follows:

*h* is the feeding-block, set to move on slides 11, and moved back and forth by a compound lever, *i*, set on a fulcrum, 12, which lever is acted upon to give the sidewise motion by the part 16 of the cam *f*, and a spring, 15, keeps said lever toward the cam 16.

*g* is a hollow screw, through which the wire, 4, passes, and said screw, taking the block *h*, determines the point to which said block is allowed to return by the spring 15, and consequently the amount, or length of wire fed forward each motion.

The wire, 4, passes through a slot in the bolt 13, and beneath the ends of the friction spring-clamp 14. This clamp is relieved as the block *h* slides back, and clamps upon the wire, to feed the same as the said block is moved forward by a compound action of the lever *i*, as follows:

The lever *i* is formed with a lower piece, 19, that sets with a slot around the lower part of the fulcrum 12, and has a fulcrum, 20, at the end of the said lever *i*, near the slide *h*, and the bolt 13 passes through this lever 19, and terminates with a nut.

17 is a cam-piece on the hub of cam *f*, acting on the end, 18, of the lever 19, which is turned up so as to be higher than the end of the lever *i*.

It will now be seen, that the cams being properly shaped and timed, the levers *i* and 19 move on the fulcrum 12 horizontally, and give motion to the block *h*, and at the same time the lever 19 is given a compound motion, to clamp the wire, by pressing down the end, 18, and then the said wire is relieved as the block *h* draws back, the said lever 19 acting to clamp the wire through the bolt 13 and spring-clamp 14.

9 is a lever on a fulcrum, 10, which holds the wire, 4, passing beneath it, except when said wire is being fed along, at which time, the end of said lever 9, dropping into a depression, 8, of the cam *f*, the hold of said lever on the wire is relieved.

The wire, 4, passes through a hole in the shears, or cutting-slide *l*, and also through the holding-jaw *k*, and its exact length is determined by a gauge-slide, *m*, which is moved by the cam *z z*.

The cam *n* is used to give a forward motion to the holding-jaw *k*, and then retain the same stationary while the ends of the wire are being turned, and then allow the said jaw *k* to return to the position shown in the drawing, and the parts are so timed that the wire, 4, is fed along, and forces out the turned pillar or arbor from the jaw *k*. The gauge-slide *m* then comes up by the cam *z z*, to determine the length of the blank, and then the cutting-slide, or shear *l* is moved by the cam 21, which separates the blank from the continuous wire, and the jaw *k* is again projected forward, and held by the cam *n*.

The holding-jaw *k* is set in slides *v v*, and is provided with a movable tail-piece, 25, that takes the cam *n*, and is adjustable, to allow for any wear, and the jaw 26, forming one side of the holding-jaw *k*, is fitted on screw-bolts 27, around which are helical springs, tending to keep the jaws closed, but not so strong as to prevent the wire, 4, passing freely into the hole, for its reception, that is made between said jaws, and formed conically at its end.

In order to clamp the blank within these jaws while being turned, the screw 29 is used in the fixed head *p*, against which the moving jaw 26 is pressed by the cam *n*.

28 is a screw, passing freely through the head *p*, into the jaw *k*, by which screw the said jaw is adjusted to stand at the proper point for receiving the wire 4.

The turning of the ends of the blanks, to form pillars, arbors, &c., is effected by chucks *t*, having proper tools, 32, secured in them, for forming the ends of the pillars into the shape shown in Figure 4, or into any other desired form.

These chucks *t* are mounted on mandrels, 31, and rotated by competent power applied to the pulleys *s s*, and the mandrels are mounted in suitable heads, *q r*, one of which, *q*, is fixed to the bed *a*, and the mandrel slides through it; the other, *r*, is set in slides, 30, so as to move bodily along.

Endwise motion is given to the mandrel by means of cams *u u'*, on the shaft *e*, acting on levers *v v'* set on fulcra, 33, with returning-springs, 34, and one lever, *v*, is connected to the sliding mandrel 31 by a block, 35, receiving a ball at the end of said mandrel, and the other lever, *v'*, is connected to the sliding head *r* at 36.

Having thus described the construction and operation of the said machine, it is remarked, that where it becomes necessary to fit our machine so as to use it with blanks already cut up into proper lengths, we simply remove the lever 9, and attach the hopper, or slide 37, shown in Figure 5, into which the blanks are placed in a horizontal position, and the lower blank is pushed out, every vibration of the slide or feeding-block *h*, by a stationary pusher, attached in place of the wire, 4; and, to retain said pusher to the said feeding-block, we force the lever 19 down by a screw, 38, that passes through the lever *i*.

The jaw *k* might have an oscillating motion on a centre, instead of a sliding motion, but it is preferred that the jaw be fitted in the manner shown.

No claim is made herein for the use of two chucks simultaneously brought up to turn the ends of a wire, to form a pillar, shaft, or arbor, as the same has been in use and on sale for many years. Neither is any particular device claimed for holding the turning-tools with the chucks. Neither is any sliding mandrel or mandrel-head claimed, as these are well known for other purposes. Neither is the straightener claimed, as the same is well known; but

What is claimed, and desired to be secured by Letters Patent, is—

1. The combination, substantially as described, of the wire to be operated on; the straightener and its sliding carriage, or support; mechanism for drawing forward the wire, and with it the straightener and its carrier; mechanism for holding the wire in a fixed position after each successive drawing, or feed forward; and mechanism for gradually forcing the straightener and its carriage back to their original positions after each movement forward, for the purposes of straightening the wire and feeding it up to the cutters and jaws.

2. The compound levers *i* and 19, made and acting in connection with the feeding-slide *h* and clamp 14, substantially as and for the purposes specified.

3. The holding-jaws *k* and 26, constructed and combined substantially as described, in combination with the screws 28 and 29 and the cam *n*, substantially as and for the purpose set forth.

4. The holding-jaws *k* and 26, constructed and combined substantially as described, in combination with the screws 28 and 29, cam *n*, and turning-tools, 32, substantially as and for the purpose set forth.

5. The combination of the feeding-device *h*, hopper 37, jaws *k* and 26, and the turning-tools, 32, as and for the purpose set forth.

In witness whereof, I have hereunto set my signature, this 1st day of April, 1868.

W. H. NETTLETON.

Witnesses:
GEO. D. WALKER,
CHAS. H. SMITH.